(12) United States Patent
Mitsutani

(10) Patent No.: US 11,277,022 B2
(45) Date of Patent: Mar. 15, 2022

(54) POWER SUPPLY DEVICE

(71) Applicant: TOYOTA JIDOSHA KABUSHIKI KAISHA, Toyota (JP)

(72) Inventor: Noritake Mitsutani, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 150 days.

(21) Appl. No.: 16/386,314

(22) Filed: Apr. 17, 2019

(65) Prior Publication Data

US 2019/0363559 A1 Nov. 28, 2019

(30) Foreign Application Priority Data

May 23, 2018 (JP) .............................. JP2018-098921

(51) Int. Cl.
| H02J 7/34 | (2006.01) |
| B60L 1/00 | (2006.01) |
| B60R 16/033 | (2006.01) |

(52) U.S. Cl.
CPC ............... *H02J 7/342* (2020.01); *B60L 1/00* (2013.01); *B60R 16/033* (2013.01); *B60Y 2400/61* (2013.01); *H02J 2207/20* (2020.01)

(58) Field of Classification Search
None
See application file for complete search history.

(56) References Cited

U.S. PATENT DOCUMENTS

| 2010/0244782 A1 | 9/2010 | Nagayama et al. |
| 2018/0105058 A1* | 4/2018 | Symanow ............. B60L 11/1862 |
| 2019/0257234 A1 | 8/2019 | Sasaki et al. |

FOREIGN PATENT DOCUMENTS

| JP | 2010-130877 A | 6/2010 |
| JP | 2010-206886 A | 9/2010 |
| JP | 2012-010503 A | 1/2012 |
| JP | 2013-081349 A | 5/2013 |
| JP | 2013-110837 A | 6/2013 |
| JP | 2015-077036 A | 4/2015 |
| WO | 2014/060812 A2 | 4/2014 |
| WO | 2015/052567 A1 | 4/2015 |
| WO | 2015/063556 A1 | 5/2015 |

* cited by examiner

*Primary Examiner* — Robert Grant
(74) *Attorney, Agent, or Firm* — Oliff PLC

(57) ABSTRACT

A power supply device includes: a high voltage power system including a high-voltage battery; a low voltage power system including a low-voltage battery of which an output voltage is lower than that of the high-voltage battery; a DCDC converter configured to step down an output voltage from the high-voltage battery and supply the stepped-down voltage to the low voltage power system; and a control unit configured to control a voltage to be supplied to the low voltage power system by the DCDC converter, based on a request from the low voltage power system and information representing a charge/discharge power of the high-voltage battery.

8 Claims, 5 Drawing Sheets

POWER SUPPLY DEVICE

BACKGROUND OF THE INVENTION

Field of the Invention

The present invention relates to a power supply device mountable to a vehicle and the like.

Description of the Background Art

In vehicles and the like, a power supply device that includes a high-voltage battery (main battery), and a low-voltage battery (auxiliary machine battery) of which the output voltage is lower than that of the high-voltage battery, is used. The high-voltage battery and the low-voltage battery are connected to each other via a DCDC converter. The high-voltage battery, a motor generator (MG), and the like are disposed on the high voltage side of the DCDC converter, to configure a high voltage power system. Meanwhile, the low-voltage battery, and an auxiliary machine such as an air conditioner and an audio device are disposed on the low voltage side of the DCDC converter, to configure a low voltage power system. An output voltage of the high-voltage battery is stepped down by the DCDC converter, and the stepped-down voltage is supplied to the low voltage power system, and the low-voltage battery can be charged by the output power of the high-voltage battery.

According to the disclosure of Patent Literature 1 (Japanese Laid-Open Patent Publication No. 2012-10503), when voltage from a high-voltage battery is stepped down by a DCDC converter to charge a low-voltage battery, output voltage of the DCDC converter is controlled so as to be reduced after charging as compared to when charging is being performed, whereby charging is quickly performed and power consumption of the DCDC converter after the charging is inhibited.

According to the disclosure of Patent Literature 2 (Japanese Laid-Open Patent Publication No. 2015-77036), in a case where an ignition switch is off, when a low-voltage battery is charged via a DCDC converter by a high-voltage battery, supply of high voltage from the high-voltage battery to devices other than the DCDC converter is interrupted, whereby unnecessary application of high voltage to the other devices is inhibited.

In a case where a low-voltage battery is charged by the output power from a high-voltage battery, when a power storage amount (SOC) of the high-voltage battery is low, the high-voltage battery is overdischarged if another power supply such as a generator is not connected or when an amount of power supplied from another power supply is low, and this may lead to deterioration of the quality and reduction of the lifespan.

SUMMARY OF THE INVENTION

The present invention is made in view of the aforementioned problem, and an object of the present invention is to provide a power supply device capable of preferably preforming power distribution between a high-voltage battery and a low-voltage battery, and inhibiting the quality of the battery from deteriorating.

In order to solve the aforementioned problem, one aspect of the present invention is directed to a power supply device that includes: a high voltage power system including a high-voltage battery; a low voltage power system including a low-voltage battery of which an output voltage is lower than that of the high-voltage battery; a DCDC converter configured to step down an output voltage from the high-voltage battery and supply the stepped-down voltage to the low voltage power system; and a control unit configured to control a voltage to be supplied to the low voltage power system by the DCDC converter, based on a request from the low voltage power system and information representing a charge/discharge power of the high-voltage battery.

Therefore, power supply from the high-voltage battery to the low voltage power system can be controlled based on a state of the high-voltage battery, whereby the quality of the high-voltage battery can be inhibited from deteriorating.

Furthermore, the control unit may perform feedback control for obtaining such a control target that the charge/discharge power or a current of the high-voltage battery is within a predetermined range.

Therefore, voltage to be supplied can be advantageously controlled.

Furthermore, the control unit may more preferentially set the voltage to be supplied to the low voltage power system so as to be within a predetermined range as compared to obtaining the control target.

Therefore, the quality of the low-voltage battery can be particularly advantageously inhibited from deteriorating.

As described above, according to the present invention, a voltage command value for the DCDC converter can be controlled based on not only a power demand from the low voltage power system but also the charge/discharge power of the high-voltage battery, so that distribution of power from the high-voltage battery to the low voltage power system can be advantageously performed while the quality of the high-voltage battery is inhibited from deteriorating.

DESCRIPTION OF THE PREFERRED EMBODIMENTS (Overview)

A power supply device according to the present invention includes a high-voltage battery and a low-voltage battery, and a DCDC converter steps down voltage on the high-voltage battery side, to supply the stepped-down voltage to the low-voltage battery-side. A control unit controls a voltage command value for the DCDC converter, based on not only a power demand from a low voltage power system but also charge/discharge power of the high-voltage battery.

Embodiment

Figure 1:
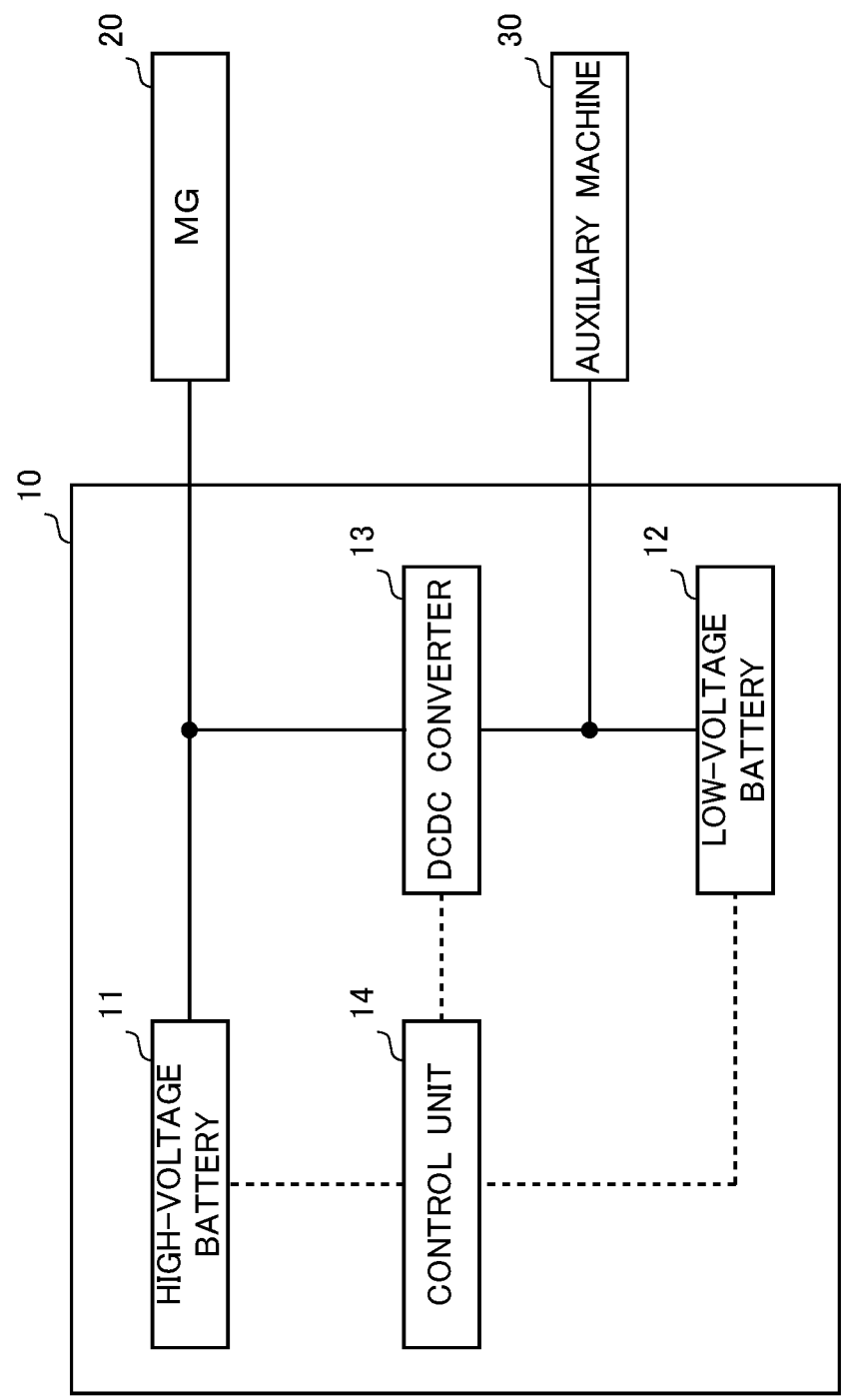
FIG. 1 is a functional block diagram illustrating a power supply device according to one embodiment of the present invention.

One embodiment of the present invention will be described below in detail with reference to the drawings.
<Configuration>
FIG. 1 is a functional block diagram illustrating a power supply device 10 according to the present embodiment. The power supply device 10 is mounted to a vehicle, and includes a high-voltage battery 11 (main battery), and a low-voltage battery 12 (auxiliary machine battery) of which the output voltage is lower than that of the high-voltage battery 11. The high-voltage battery 11 and the low-voltage battery 12 are connected to each other via a DCDC converter 13. The high-voltage battery 11 side with respect to the DCDC converter 13 is a high voltage power system. A load of a high-voltage system such as a motor generator (MG) 20, and a generator, or a charger and the like are connected to the high voltage power system. The low-voltage battery 12 side with respect to the DCDC converter 13 is a low voltage power system. An auxiliary machine 30 such as an air conditioner and an audio device is connected to the low voltage power system. A voltage of the high voltage power system can be stepped down by the DCDC converter 13 and the stepped-down voltage can be supplied to the low voltage power system, so that the low-voltage battery 12 can be charged and the auxiliary machine 30 can be driven by the output power of the high-voltage battery 11.

Figure 2:
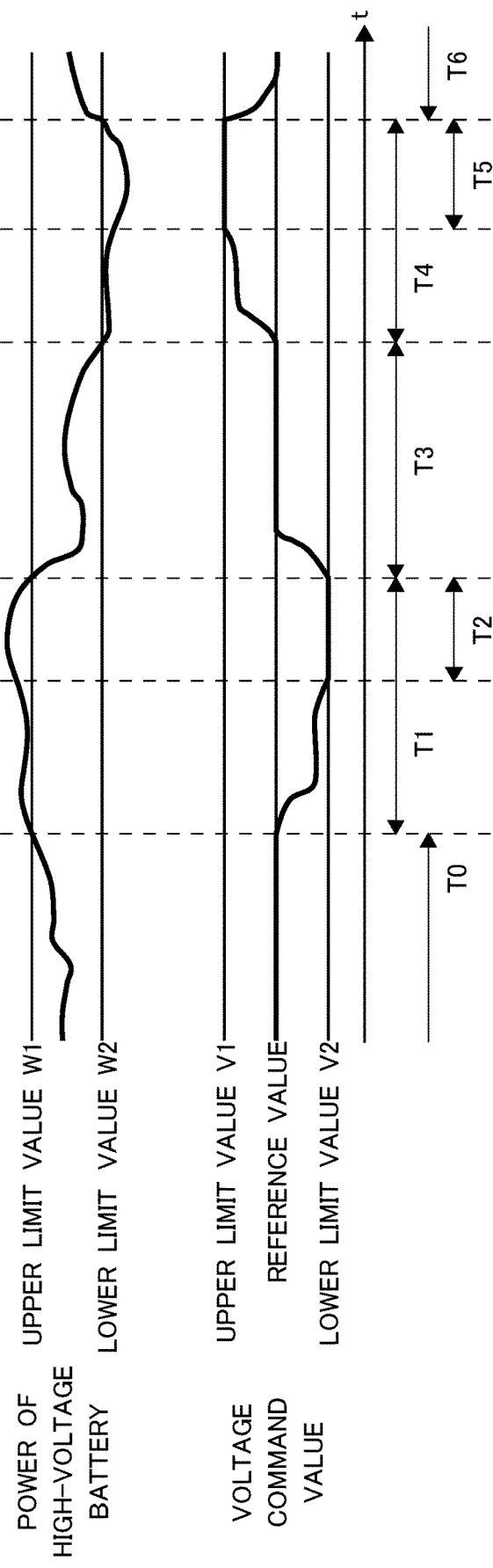
FIG. 2 illustrates examples of temporal change of power of a high-voltage battery and temporal change of a voltage command value, according to one embodiment of the present invention.

A control unit 14 obtains various states such as a voltage and current of the high-voltage battery 11, and various states such as a voltage and current of the low-voltage battery 12, determines. as a voltage command value, a voltage to be supplied from the DCDC converter 13 to the low voltage power system, and outputs the voltage command value to the DCDC converter 13. The DCDC converter 13 outputs voltage to be supplied to the low voltage power system according to the voltage command value.
<Process>
An example of a process performed by the control unit 14 of the power supply device 10 according to the present embodiment will be described below. FIG. 2 illustrates examples of temporal change of discharge or charge (input) power of the high-voltage battery 11 in the case of the discharge (output) being positive, and temporal change of the voltage command value outputted by the control unit 14.

The control unit 14 obtains a state of the low-voltage battery 12. The state of the low-voltage battery 12 represents, for example, one or more measured values such as a voltage, current, and temperature obtained by a sensor, and a power storage amount calculated based on the measured values. Furthermore, the control unit 14 may obtain power required by the auxiliary machine 30 from the auxiliary machine 30 or another device (not shown) that controls the auxiliary machine 30. The control unit 14 determines power to be supplied and received from the high-voltage battery 11 based on the above-described values and amount, and determines a reference value of the voltage command value according thereto. That is, the reference value is determined according to a present state of charging and discharging of the low-voltage battery 12, and a power demand from the low voltage power system. When the voltage command value is greater than a predetermined upper limit value V1, and when the voltage command value is less than a predetermined lower limit value V2, the low-voltage battery 12 may be overcharged or overdischarged. Therefore, the reference value is determined so as to be within a predetermined voltage range, that is, determined so as to be not less than the lower limit value V2 and not greater than the upper limit value V1.

In the present embodiment, the control unit 14 corrects the above-described reference value according to charge/discharge power of the high-voltage battery 11. The control unit 14 can calculate charge/discharge power based on one or more measured values, obtained by a sensor, such as a voltage, current, and temperature of the high-voltage battery 11.

The control unit 14 corrects the reference value such that the charge/discharge power of the high-voltage battery 11 is in a predetermined range of power in which deterioration of the quality of the high-voltage battery 11 can be inhibited, that is, such that the charge/discharge power of the high-voltage battery 11 is not less than a predetermined lower limit value W2 and not greater than a predetermined upper limit value W1. This correction can be preferably performed by, for example, feedback control such as PI control.

An example of the control will be described with reference to FIG. 2. In a time period T0, the charge/discharge power of the high-voltage battery 11 is within a predetermined range of power, and the control unit 14 sets the reference value to the voltage command value without performing the correction.

In a time period T1 when the charge/discharge power of the high-voltage battery 11 is greater than the upper limit value W1, the control unit 14 corrects the reference value so as to reduce the reference value, and sets the corrected value as the voltage command value. The corrected voltage command value may be set so as not to be less than the lower limit value V2 regardless of the charge/discharge power of the high-voltage battery 11, as indicated in a time period T2. This is advantageous when the low-voltage battery 12 has the characteristic that its quality is more likely to deteriorate due to overcharging or overdischarging than the high-voltage battery 11. In a time period T3 when the charge/discharge power of the high-voltage battery 11 is reduced so as to be within the predetermined range of power, the control unit 14 gradually returns the voltage command value to the reference value so as to follow charge/discharge power of the high-voltage battery 11.

In a time period T4 when the charge/discharge power of the high-voltage battery 11 is less than the lower limit value W2, the control unit 14 corrects the reference value so as to increase the reference value, and sets the corrected value as the voltage command value. The corrected voltage command value may be set so as not to be greater than the upper limit value V1 regardless of the charge/discharge power of the high-voltage battery 11, as indicated in a time period T5. This is advantageous when, as described above, the low-voltage battery 12 has the characteristic that its quality is more likely to deteriorate than the high-voltage battery 11. In a time period T6 when the charge/discharge power of the high-voltage battery 11 is increased so as to be within the predetermined range of power, the control unit 14 gradually returns the voltage command value to the reference value so as to follow the charge/discharge power of the high-voltage battery 11.

The upper limit value W1 and the lower limit value W2 of the charge/discharge power of the high-voltage battery 11, and the reference value, the upper limit value V1, and the lower limit value V2 of the voltage command value as described above may vary according to, for example, a state of load such as the MG 20 or the auxiliary machine 30, and temperatures of the high-voltage battery 11 and the low-voltage battery 12 and the temporal change of characteristics thereof, in practice.

Thus, in the present embodiment, the control unit 14 determines the voltage command value for the DCDC converter 13, based on not only a power demand from the low voltage power system, but also the charge/discharge power of the high-voltage battery 11. Therefore, power supply from the high-voltage battery 11 to the low voltage power system can be performed so as to inhibit the quality of the high-voltage battery 11 from deteriorating.

APPLICATION EXAMPLE 1

Figure 3:
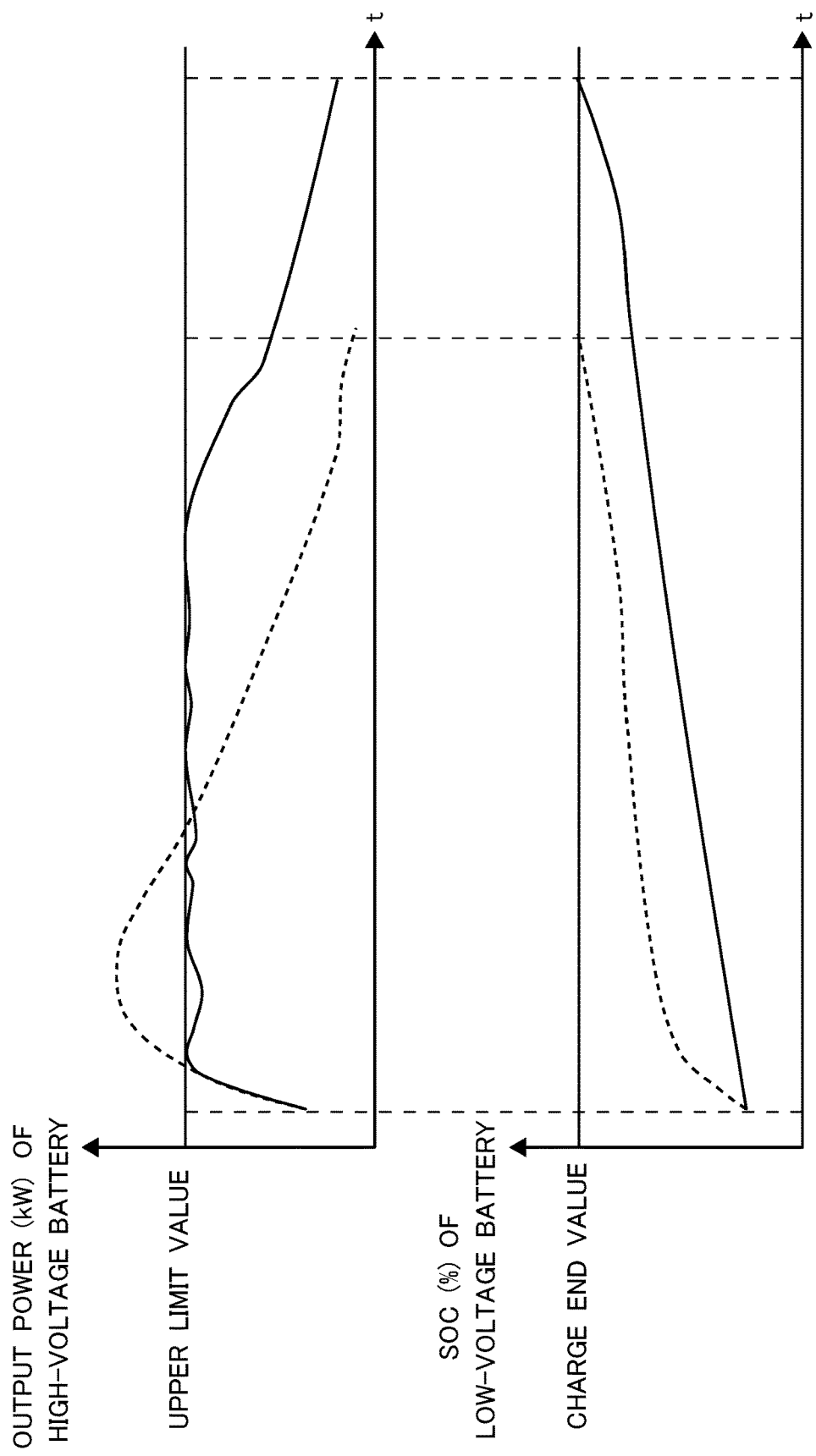
FIG. 3 illustrates examples of temporal changes of output power of the high-voltage battery and a power storage amount of a low-voltage battery, according to one embodiment of the present invention.

FIG. 3 illustrates examples of temporal changes of output power of the high-voltage battery 11 and a power storage amount of the low-voltage battery 12 in the case of the output power of the high-voltage battery 11 being supplied via the DCDC converter 13 to the low-voltage battery 12 to charge the low-voltage battery 12 in the power supply device 1. A solid line represents a case where correction of the voltage command value according to the present embodiment is applied to limit increase of the output power of the high-voltage battery 11, and a dotted line represents a case where correction of the voltage command value according to the present embodiment is not applied.

As indicated by the solid line in FIG. 3, when correction of the voltage command value according to the present embodiment is applied, the output power of the high-voltage battery 11 does not exceed the upper limit value, and possibility of deterioration of the quality is reduced. Meanwhile, as indicated by the dotted line, when correction of the voltage command value according to the present embodiment is not applied, the voltage command value is set to be excessively great based on only a request for charging which is determined by a power storage amount of the low-voltage battery 12, or the like, and the output power of the high-voltage battery 11 exceeds the upper limit value, which may lead to deterioration of the quality.

APPLICATION EXAMPLE 2

Figure 4:
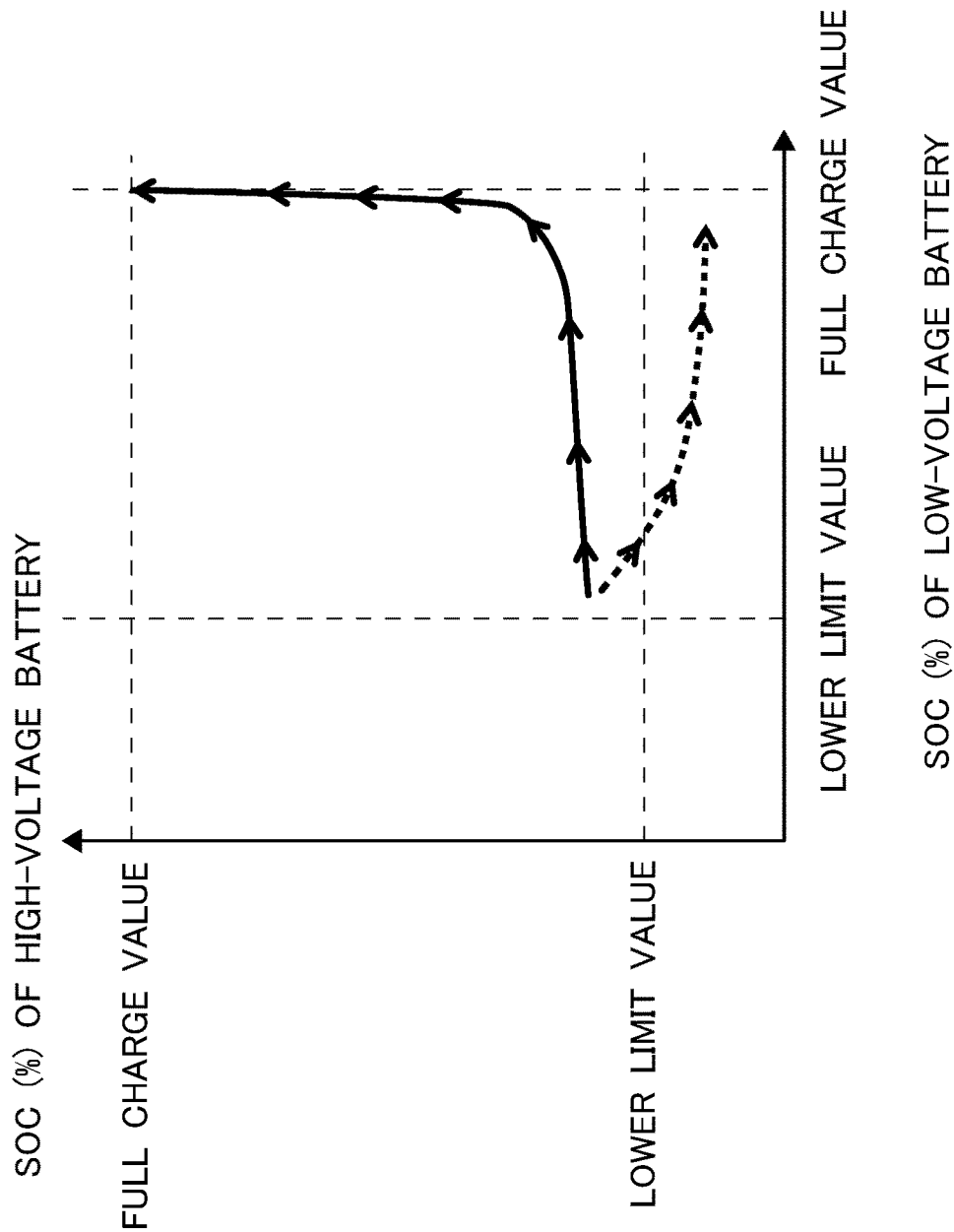
FIG. 4 illustrates examples of temporal changes of a power storage amount of the high-voltage battery and a power storage amount of the low-voltage battery, according to one embodiment of the present invention.

FIG. 4 illustrates examples of temporal changes of a power storage amount of the high-voltage battery 11 and a power storage amount of the low-voltage battery 12 in the case of the high voltage power system being connected to a charger so as to supply power from the outside, in the power supply device 1. A solid line represents a case where correction of the voltage command value according to the present embodiment is applied to regulate output power of the high-voltage battery 11, and a dotted line represents a case where correction of the voltage command value according to the present embodiment is not applied.

Figure 5:
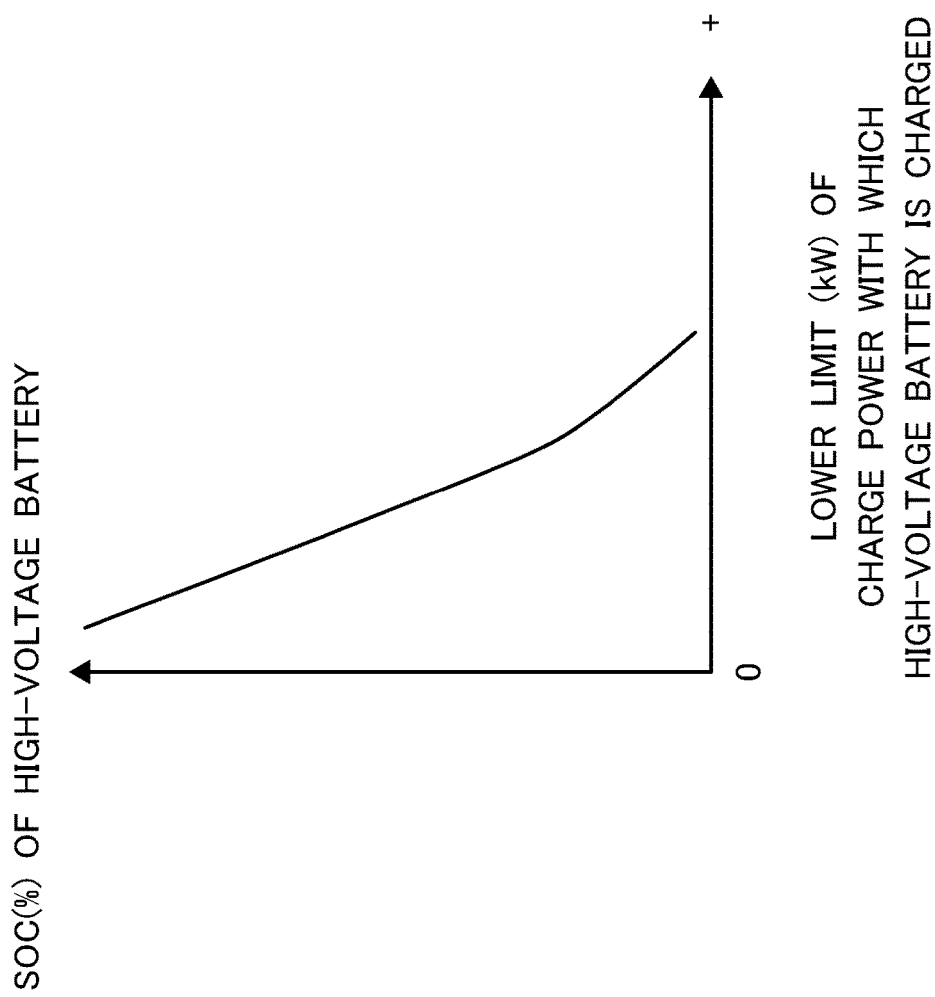
FIG. 5 illustrates an example of a relationship between charge power with which the high-voltage battery is charged, and a power storage amount of the high-voltage battery, according to one embodiment of the present invention.

As indicted by the solid line in FIG. 4, when the correction of the voltage command value according to the present embodiment is applied, discharging of the high-voltage battery 11 is inhibited. Thus, although power supplied from the outside is used for charging the low-voltage battery 12, power of the high-voltage battery 11 is not used for charging the low-voltage battery 12, and a power storage amount of the high-voltage battery 11 is not reduced so as to be less than the lower limit value, and possibility of deterioration of the quality is reduced. FIG. 5 illustrates an example of a relationship between charge power with which the high-voltage battery 11 is charged, and a power storage amount of the high-voltage battery 11, in this case. As shown in FIG. 5, when a power storage amount of the high-voltage battery 11 is low, charge power with which the high-voltage battery 11 is charged can be increased to inhibit reduction of the power storage amount. Meanwhile, as indicated by the dotted line, when the correction of the voltage command value according to the present embodiment is not applied, the voltage command value is set to be excessively great based on only a request for charging which is determined by a power storage amount of the low-voltage battery 12, or the like, and power of the high-voltage battery 11 is used, together with power supplied from the outside, for charging the low-voltage battery 12, and a power storage amount of the high-voltage battery 11 may be thus reduced so as to be less than the lower limit value, which may lead to deterioration of the quality. When charging is performed from the outside by using a charger, a separate charging DCDC converter which is provided in parallel with the DCDC converter 13 is considered to be used. Also in this case, similar control can be performed for the charging DCDC converter.

(Effect)

As described above, according to the present invention, the control unit 14 controls the voltage command value for the DCDC converter 13, based on not only a power demand from the low voltage power system but also charge/discharge power of the high-voltage battery 11. Thus, power supply from the high-voltage battery 11 to the low voltage power system can be performed so as to inhibit deterioration of the quality of the high-voltage battery 11, and power distribution can be advantageously performed. Furthermore, according to the present invention, the voltage command value is inhibited from being great, whereby overheating of the DCDC converter can be inhibited, and the present invention can be also applied to, for example, overheating inhibition control after dead soak. In the above-described embodiment, an example where the charge/discharge power of the high-voltage battery 11 is controlled so as to be within a predetermined range, is described. However, another state quantity such as a current or SOC of the high-voltage battery 11 may be controlled so as to be within a predetermined range. The control method is not limited to the above-described feedback control, and may be another method.

The present invention can be implemented by not only the power supply device but also a method and a program executed by a computer of the power supply device, a computer-readable non-transitory storage medium having the program stored therein, or a vehicle having the power supply device mounted therein.

The present invention is useful for a power supply device in a vehicle or the like.

What is claimed is:

1. A power supply device comprising:
    a high voltage power system including a high-voltage battery;
    a low voltage power system including a low-voltage battery of which an output voltage is lower than that of the high-voltage battery;
    a DCDC converter configured to step down an output voltage from the high-voltage battery and supply the stepped-down voltage to the low voltage power system; and
    a control unit configured to control a voltage to be supplied to the low voltage power system by the DCDC converter, based on a request from the low voltage power system and information representing a charge/discharge power of the high-voltage battery, wherein:
    the control unit determines, as a voltage command value, a voltage to be supplied from the DCDC converter to the low voltage power system, and outputs the voltage command value to the DCDC converter, so that the DCDC converter outputs voltage to be supplied to the low voltage power system according to the voltage command value, and when the charge/discharge power of the high-voltage battery is greater than an upper limit value or is less than a lower limit value, the control unit corrects the voltage command value and outputs a corrected voltage command value to the DCDC converter.

2. The power supply device according to claim 1, wherein the control unit performs feedback control for obtaining such a control target that the charge/discharge power or a current of the high-voltage battery is within a predetermined range.

3. The power supply device according to claim 2, wherein the control unit more preferentially sets the voltage to be supplied to the low voltage power system so as to be within a predetermined range as compared to obtaining the control target.

4. The power supply device according to claim 1, wherein when the charge/discharge power of the high-voltage battery is within a range between the upper limit value and the lower limit value, the control unit does not correct the voltage command value.

5. The power supply device according to claim 1, wherein the corrected voltage command value is set so as not to be less than another lower limit value regardless of the charge/discharge power of the high-voltage battery.

6. The power supply device according to claim 5, wherein the corrected voltage command value is set so as not to be greater than another upper limit value regardless of the charge/discharge power of the high-voltage battery.

7. The power supply device according to claim 1, wherein when the charge/discharge power of the high-voltage battery is greater than the upper limit value, the control unit reduces the voltage command value and outputs a reduced voltage command value to the DCDC converter.

8. The power supply device according to claim 7, wherein when the charge/discharge power of the high-voltage battery is less than the lower limit value, the control unit increases the voltage command value and outputs an increased voltage command value to the DCDC converter.

* * * * *